United States Patent [19]

Kobayashi et al.

[11] Patent Number: 5,057,566
[45] Date of Patent: Oct. 15, 1991

[54] THERMOPLASTIC RUBBER COMPOSITIONS

[75] Inventors: Toshiaki Kobayashi; Tatsuo Nakayama; Junichi Watanabe, all of Kawasaki, Japan

[73] Assignee: Nippon Zeon Co., Ltd., Tokyo, Japan

[21] Appl. No.: 271,904

[22] Filed: Nov. 15, 1988

Related U.S. Application Data

[63] Continuation-in-part of Ser. No. 830,839, Feb. 19, 1986, abandoned.

[51] Int. Cl.$^5$ ............................ C08F 8/42; C08K 5/09; C08K 5/12
[52] U.S. Cl. ................................. 524/297; 524/296; 525/195; 525/221; 525/222; 525/233; 525/239
[58] Field of Search ............... 524/296, 297; 525/195, 525/239

[56] References Cited

U.S. PATENT DOCUMENTS 4,230,832 10/1980 Wel ................................. 525/233

FOREIGN PATENT DOCUMENTS 215442 12/1983 Japan ................................. 524/296
51933 3/1984 Japan ................................. 524/296

Primary Examiner—Jacob Ziegler
Attorney, Agent, or Firm—Sherman and Shalloway

[57] ABSTRACT

A thermoplastic rubber composition comprising a nitrile rubber containing not less than 20% by weight of a gel insoluble in methyl ethyl ketone, a vinyl chloride resin containing 0.05 to 20% by weight of a carboxyl group, a compound of a monovalent or divalent metal and a plasticizer, said monovalent or divalent metal compound being an ionic crosslinking agent which reacts ionically with the carboxyl group of the vinyl chloride resin to crosslink the vinyl chloride resin.

18 Claims, No Drawings

THERMOPLASTIC RUBBER COMPOSITIONS

This application is a continuation-in-part application of Ser. No. 830,839 filed on Feb. 19, 1986, now abandon.

This invention relates to a thermoplastic rubber composition, and more specifically to a thermoplastic rubber composition having excellent creep properties at high temperatures without the need of vulcanization.

Nitrile rubbers have excellent oil resistance and heat resistance, and are widely used in auto parts, and so forth by utilizing these properties. However, said nitrile rubbers have to be vulcanized as a matter of course.

On the other hand, plasticizer-containing vinyl chloride resins known as soft vinyl chloride resins have a touch of soft rubbers, and are superior to vulcanized rubbers in moldability, weatherability, coloration and economics, finding widespread use. As said resins are however inferior to the vulcanized rubbers in creep properties at high temperatures, their use at high temperatures is limited. In order to improve the creep properties, an attempt has been made to use vinyl chloride resins having a high degree of polymerization or containing a gel. Further, a method is known wherein a compression set is improved by adding crosslinked rubber materials to gel-containing vinyl chloride resins (Japanese Laid-open Patent Applications Nos. 215442/83 and 51933/84). However, even these methods can hardly improve the creep properties (above all, a compression set and an impact resistance) at high temperatures of 100° C. or above.

Accordingly, the advent of thermoplastic rubbers having creep properties at high temperatures approximate to those of vulcanized rubbers without vulcanization and allowing heat plasticization have been increasingly demanded.

Under the circumstances, the present inventors have made extensive studies to remedy the foregoing problems and consequently discovered that the use of a composition comprising as essential components a nitrile rubber containing a specific amount of a gel, a vinyl chloride resin containing a specific amount of a carboxyl group, a compound of a monovalent or divalent metal and a plasticizer allows heat plasticization and markedly improves creep properties at high temperatures without vulcanization. This discovery has led to the completion of this invention.

The present invention thus provides a thermoplastic rubber composition comprising a nitrile rubber containing not less than 20% by weight of a gel insoluble in methyl ethyl ketone, a vinyl chloride resin containing 0.05 to 20% by weight of a carboxyl group, a compound of a monovalent or divalent metal and a plasticizer.

Examples of the nitrile rubber used in this invention are copolymers of diene monomers such as butadiene and isoprene and nitrile monomers such as acrylonitrile, methacrylonitrile and propionitrile, and copolymers of the above two monomers and copolymerizable third monomers.

Where a nitrile rubber containing a carboxyl group is employed in this invention, the impact resilience is further improved. Examples of such nitrile rubber are (1) terpolymers of diene monomers such as butadiene and isoprene, nitrile monomers such as acrylonitrile, methacrylonitrile and propionitrile and $\alpha,\beta$-unsaturated carboxylic acid monomers (2) substances obtained by hydrolyzing terpolymers of diene monomers, nitrile monomers and $\alpha,\beta$-unsaturated carboxylic acid esters, and (3) substances obtained by the addition-reaction of copolymers of diene monomers and nitrile monomers with carboxylic acids. Examples of the $\alpha,\beta$-unsaturated carboxylic acid monomers in (1) are monocarboxylic acids such as acrylic acid, methacrylic acid, crotonic acid and cinnamic acid; dicarboxylic acids such as maleic acid, fumaric acid, itaconic acid and citraconic acid; and dicarboxylic acid monoesters such as monomethyl maleate, monoethyl maleate, monobutyl maleate, monomethyl itaconate, monoethyl itaconate and monobutyl itaconate.

For the nitrile rubber to contain the gel, a method of copolymerizing monomers having plural double bonds in a molecule, such as divinylbenzene, diallyl phthalate, diallyl maleate and trimethylolpropane triacrylate or a method of causing intermolecular crosslinking on after-treatment reaction using peroxides may properly be adopted.

The acrylonitrile content of the nitrile rubber is not limited in particular, but 20 to 50% by weight is preferably from the aspect of compatibility with vinyl chloride resins. The content of the carboxyl group is 0 to 20% by weight, preferably 0.05 to 10% by weight. The content of the carboxyl group exceeding 20% by weight not only makes no sense but also is unwanted for other properties.

The gel insoluble in methyl ethyl ketone indicates a residue resulting from adding 0.2 g of the nitrile rubber to 100 ml of methyl ethyl ketone and dissolving the mixture at room temperature for 3 days, followed by filtration with a 80 mesh wire net. The content of the gel has to be not less than 20% by weight, and is preferably not less than 30% by weight. Where the gel content is less than 20% by weight, the compression set, one of the creep properties at high temperatures is not improved enough, and this is undesirable. The upper limit of the gel content is not limited in particular, but preferably at most 98% in consideration of a processability.

Examples of the carboxyl group-containing vinyl chloride resin are (1) copolymers of vinyl chloride and carboxyl group-containing monomers (e.g. monocarboxylic acids such as acrylic acid, methacrylic acid, crotonic acid and cinnamic acid, dicarboxylic acids such as maleic acid, fumaric acid, itaconic acid and citraconic acid; and dicarboxylic acid monoesters such as monomethyl maleate, monooethyl maleate, monobutyl maleate, monomethyl itaconate, monoethyl itaconate and monobutyl itaconate), (2) substances obtained by hydrolyzing copolymers of vinyl chloride and $\alpha,\beta$-unsaturated carboxylic acid esters, and (3) substances obtained by the addition reaction of vinyl chloride polymers formed in a usual manner with carcboxylic acid-containing compounds. The content of the carboxyl group of said resin is 0.05 to 20% by weight, preferably 0.2 to 10% by weight. Where the content is less than 0.05% by weight, the impact resilience at high temperatures is not improved enough. Where the content exceeds 20% by weight, it makes no sense and is also unwanted for other properties.

Typical examples of the compound of the monovalent or divalent metal are oxides, hydroxides, carboxylates such as acetates, propionates, octylats, caprinates, stearates and naphthenates, thiocarboxylates, sulfonates and phosphates of metals such as $Li^+$, $Na^+$, $K^+$, $Cs^+$, $Mg^{++}$, $Ca^{++}$, $Ba^{++}$, $Zn^{++}$ and $Cd^{++}$. Complex salts of acetylacetone and said metals are also a preferable example. These are used singly or as a mixture of two or more. The amount of the metal compound is preferably 0.1 to 3 mol equivalents based on the amount of the carboxyl group of the vinyl chloride resin. This metal compound is presumed to act as a so-called ionic crosslinking agent which reacts ionically with the carboxyl group of the vinyl chloride resin to crosslink the vinyl chloride resin.

As the plasticizer employed in this invention, plasticizers commonly used in soft vinyl chloride resins are available. Concrete examples thereof are phthalate esters such as di-2-ethylhexyl phthalate, di-n-octyl phthalate, diisodecyl phthalate, dibutyl phthalate and dihexyl phthalate; linear dibasic acid esters such as dioctyl adipate and dioctyl sebacate; trimellitate ester-type or polyester-type polymeric plasticizers; epoxidized plasticizers such as epoxidized soybean oil and epoxidized linseed oil; and phosphate esters such as triphenyl phosphate and tricresyl phosphate. They are used singly or as a mixture of two or more.

The mixing ratio of the nitrile rubber to the carboxyl group-containing vinyl chloride resin is 5:95 to 90:10, preferably 10:90 to 80:20. Where the mixing ratio is less than 5:95, the compression set is not improved enough. Where it exceeds 90:10, the melt moldability lowers and a processing method is then restricted.

The amount of the plasticizer employed in this invention is properly selected depending on the hardness of the intended product. Considering the soft rubbery product, it is preferably 20 to 300 parts by weight per 100 parts by weight of the carboxyl group-containing vinyl resin.

When producing the thermoplastic rubber composition in this invention, varied additives such as stabilizers, lubricants, fillers, antioxidants, ultrviolet absorbers, processing aids, blowing agents, pigments, fire retardants and impact resistance aids can be optionally added as in common vinyl chloride resins. Other polymers may be further mixed.

Molded articles having excellent creep properties at high temperatures are obtained by molding the resulting compositions by a usual vinyl chloride resin processing method such as extrusion molding, compression molding, calender molding, hollow molding or injection molding. These molded articles are preferably used as automobile window seal materials, cable sheath materials and packings.

The following Examples illustrate this invention in more detail. All parts and percentages in Examples are on the weight basis unless otherwise instructed.

EXAMPLE 1

A nitrile rubber, a vinyl chloride resin and magnesium acetylacetonate in amounts shown in Table 1 were kneaded together with 100 parts of di-2-ethylhexyl phthalate (plasticizer) and 4 parts of dibutyltin maleate (stabilizer) for 10 minutes through a hot roll of 150° C. There resulted sheets. These sheets were hot-pressed at 175° C. for 10 minutes to form pressed test pieces having a given thickness.

Said pressed test pieces were measured for an impact resilience and a compression set. The impact resilience (%) was determined at 140° C. by a Dunlop tripsometer according to BS. 903 Part A8:1963. The compression set (%) was determined after performing 25% compression at 100° C. for 70 hours according to JIS k-6301. The results are shown in Table 1.

TABLE 1

| | Nitrile rubber | | | Vinyl chloride resin | | | | | |
|---|---|---|---|---|---|---|---|---|---|
| | Content of acrylonitrile (%) | Content of methyl ethyl ketone-insoluble gel (%) | Amount of nitrile rubber (parts) | Type of carboxyl group-containing comonomer | Content of carboxyl group (%) | Average degree of polymerization | Amount of vinyl chloride resin (parts) | Amount of magnesium acetylacetonate (parts) | Impact resilience (%) | Compression set (%) |
| This invention | | | | | | | | | | |
| 1 | 33 | 70 | 100 | Monomethyl maleate | 1.8 | 2,500 | 100 | 4.3 | 45 | 50 |
| 2 | 45 | 90 | " | Monomethlyl maleate | " | " | " | " | 51 | 46 |
| 3 | 25 | 85 | " | Monomethyl maleate | " | " | " | " | 52 | 47 |
| 4 | 33 | 30 | " | Monomethyl maleate | " | " | " | " | 45 | 52 |
| 5 | " | 70 | 20 | Monomethyl maleate | " | " | " | " | 52 | 53 |
| 6 | " | " | 300 | Monomethyl maleate | " | " | " | " | 42 | 44 |
| 7 | " | " | 100 | Monomethyl maleate | 0.4 | 3,200 | " | 0.8 | 43 | 48 |
| 8 | " | " | " | Monomethyl maleate | 7.2 | 1,800 | " | 19.0 | 50 | 52 |
| 9 | " | " | " | Acrylic acid | 3.3 | 2,400 | " | 7.8 | 46 | 49 |
| 10 | " | " | " | Itaconic acid | 4.0 | 2,000 | " | 9.6 | 42 | 52 |
| Comparative Example | | | | | | | | | | |
| 1 | 33 | 5 | 100 | Monomethyl maleate | 1.8 | 2,500 | 100 | 4.3 | 38 | 62 |
| 2 | " | 70 | " | Monomethyl maleate | 0.02 | 1,500 | " | " | 25 | 60 |
| 3 | " | " | " | Vinyl chloride homopolymer | | 2,500 | " | " | 24 | 55 |
| 4 | — | — | 0 | Vinyl chloride homopolymer | " | " | " | " | 38 | 65 |
| 5 | 33 | 70 | 100 | — | — | — | 0 | 0 | Incapable of |

TABLE 1-continued

| | Nitrile rubber | | | Vinyl chloride resin | | | | | |
|---|---|---|---|---|---|---|---|---|---|
| Content of acrylo- nitrile (%) | Content of methyl ethyl ketone- insoluble gel (%) | Amount of nitrile rubber (parts) | Type of carboxyl group- containing comonomer | Content of carboxyl group (%) | Average degree of polymeri- zation | Amount of vinyl chloride resin (parts) | Amount of magnesium acetyl- acetonate (parts) | Impact resil- ience (%) | Com- pres- sion set (%) |
| | | | | | | | | | molding |

EXAMPLE 2

The procedure in Example 1 was followed except using 100 parts of a nitrile rubber containing 33% of acrylonitrile and 70% of a methyl ethyl ketone-insoluble gel, 100 parts of a vinyl chloride resin containing 1.8% of a carboxyl group and having an average degree of polymerization of 2,500, 4 parts of dibutyltin maleate, and a metal compound and a plasticizer in amounts shown in Table 2. The resulting test pieces were measured as in Example 1. The results are shown in Table 2.

butadiene, methacrylic acid and divinylbenzene in given amounts. A vinyl chloride polymer having a composition shown in Table 3 was formed by suspension polymerizing vinyl chloride and monomethyl maleate in given amounts.

The nitrile rubber, the vinyl chloride polymer and magnesium acetylacetonate in amounts shown in Table 3 were kneaded together with 100 parts of di-2-ethylhexyl phthalate (plasticizer) and 4 parts of dibutyltin maleate (stabilizer) for 10 minutes through a hot roll of 150° C. There resulted sheets. These sheets were hot-pressed at 175° C. for 10 minutes to form pressed test

TABLE 2

| | Metal compound | | Plasticizer | | Impact resilience (%) | Compres- sion set (%) |
|---|---|---|---|---|---|---|
| | Type | Amount (parts) | Type | Amount (parts) | | |
| This invention | | | | | | |
| 11 | Zinc octylate | 6.8 | Di-2-ethylhexyl phthalate | 100 | 46 | 52 |
| 12 | Calcium hydroxide | 1.8 | Di-2-ethylhexyl phthalate | 150 | 43 | 48 |
| 13 | Sodium hydroxide | 1.6 | Di-2-ethylhexyl phthalate | 75 | 52 | 54 |
| 14 | Magnesium acetylacetonate | 4.3 | Trioctyl trimellitate | 100 | 48 | 53 |
| 15 | Calcium acetylacetonate | 4.6 | Dioctyl adipate | 70 | 58 | 55 |
| 16 | Calcium acetylacetonate | " | PN-250* | 80 | 52 | 54 |
| Comparative Example | | | | | | |
| 6 | No | | Di-2-ethylhexyl phthalate | 100 | 28 | 55 |
| 7 | Calcium hydroxide | 1.8 | No | | 43 | 85 |

*Tradename for a polyester-type polymeric plasticizer made by Adeka Argus Chemical Co., Ltd.

EXAMPLE 3

A nitrile rubber having a composition shown in Table 3 wa formed by emulsion polymerizing acrylonitrile, pieces having a given thickness. The test pieces were measured as in Example 1. The results are shown in Table 3.

TABLE 3

| | Nitrile rubber | | | | Vinyl chloride polymer | | | | | |
|---|---|---|---|---|---|---|---|---|---|---|
| | Content of acrylo- nitrile (%) | Content of carboxyl group (%) | Content of methyl ethyl ketone- insoluble gel (%) | Amount of nitrile rubber (parts) | Content of carboxyl group (%) | Average degree of polymeri- zation | Amount of vinyl chloride polymer (parts) | Amount of magnesium acetyl- acetonate (parts) | Impact resil- ience (%) | Com- pres- sion set (%) |
| This invention | | | | | | | | | | |
| 17 | 33 | 3.5 | 83 | 100 | 1.8 | 2,500 | 100 | 12.7 | 52 | 51 |
| 18 | " | 0.3 | 80 | " | 0.4 | 3,200 | " | 1.7 | 48 | 48 |
| 19 | " | 1.2 | 30 | " | 1.8 | 2,500 | " | 7.2 | 50 | 54 |
| 20 | 45 | " | 90 | " | 7.2 | 1,800 | " | 20.0 | 56 | 48 |
| 21 | 25 | " | 85 | " | 1.8 | 2,500 | " | 7.2 | 57 | 49 |
| 22 | 33 | " | " | 300 | " | " | " | 12.9 | 47 | 46 |
| 23 | " | " | " | 20 | " | " | " | 4.8 | 57 | 54 |
| Comparative Example | | | | | | | | | | |
| 8 | 33 | 1.2 | 0 | 100 | 1.8 | 2,500 | 100 | 7.2 | 41 | 64 |
| 9 | " | " | 85 | " | (Vinyl chloride | 1,450 | " | 3.1 | 29 | " |

TABLE 3-continued

| | Nitrile rubber | | | Vinyl chloride polymer | | | | | |
|---|---|---|---|---|---|---|---|---|---|
| | Content of acrylo-nitrile (%) | Content of carboxyl group (%) | Content of methyl ethyl ketone-insoluble gel (%) | Amount of nitrile rubber (parts) | Content of carboxyl group (%) | Average degree of polymeri-zation | Amount of vinyl chloride polymer (parts) | Amount of magnesium acetyl-acetonate (parts) | Impact resil-ience (%) | Com-pres-sion set (%) |
| 10 | " | " | " | " | homo-polymer) — | — | 0 | " | Incapable of molding | |
| 11 | — | — | — | 0 | 1.8 | 2,500 | 100 | 4.3 | 38 | 65 |

EXAMPLE 4

A test was carried out following the same procedure as used in Run No. 19 of Example 3 except that the metal compounds and plasticizers shown in Table 4 were used instead of the magnesium acetylacetonate and plasticizer used in Run No. 19 of Example 3. The results are shown in Table 4.

TABLE 4

| | Metal compound | | Plasticizer | | Impact resilience (%) | Compres-sion set (%) |
|---|---|---|---|---|---|---|
| | Type | Amount (parts) | Type | Amount (parts) | | |
| This invention | | | | | | |
| 24 | Zinc octylate | 11.3 | Di-2-ethylhexyl phthalate | 100 | 51 | 54 |
| 25 | Calcium hydroxide | 3.0 | Di-2-ethylhexyl phthalate | 150 | 48 | 49 |
| 26 | Sodium hydroxide | 2.7 | Di-2-ethylhexyl phthalate | 75 | 57 | 56 |
| 27 | Magnesium acetylacetonate | 7.2 | Trioctyl trimellitate | 100 | 53 | 55 |
| 28 | Calcium acetylacetonate | 7.7 | Dioctyl adipate | 70 | 60 | 57 |
| 29 | Calcium acetylacetonate | " | PN-250* | 80 | 57 | 56 |
| Comparative Example | | | | | | |
| 12 | No | | Di-2-ethylhexyl phthalate | 100 | 29 | 57 |
| 13 | Calcium hydroxide | 1.8 | No | | 42 | 88 |

*Tradename for a polyester-type polymeric plasticizer made by Adeka Argus Chemical Co., Ltd.

What we claim is:

1. A thermoplastic rubber composition comprising a nitrile rubber containing not less than 20% by weight of a gel insolule in methyl ethyl ketone, a vinyl chloride resin containing 0.05 to 20% by weight of a carboxyl group, a compound of a monovalent or divalent metal and a plasticizer, said monovalent or divalent metal compound being an ionic crosslinking agent which reacts ionically with the carboxyl group of the vinyl chloride resin to crosslink the vinyl chloride resin.

2. The thermoplastic rubber composition of claim 1 wherein the gel-containing nitrile rubber is obtained by copolymerizing monomers having plural double bonds in a molecule.

3. The thermoplastic rubber composition of claim 1 wherein the content of acrylonitrile of the nitrile rubber is 20 to 50% by weight.

4. The thermoplastic rubber composition of claim 1 wherein the nitrile rubber contains up to 20% by weight of the carboxyl group.

5. The thermoplastic rubber composition of claim 1 wherein the carboxyl group-containing vinyl chloride resin is selected from the group consisting of (1) a copolymer of vinyl chloride and a monocarboxylic acid, a dicarboxylic acid or a dicarboxylic acid monoester, (2) a substance obtained by hydrolyzing a copolymer of vinyl chloride and an $\alpha,\beta$-unsaturated carboxylic acid ester, and (3) a substance obtained by the addition-rection of a vinyl chloride polymer with a carboxylic acid-containing compound.

6. The thermoplastic rubber composition of claim 1 wherein the mixing weight ratio of the nitrile rubber to the vinyl chloride resin is 5:95 to 90:10.

7. The thermoplastic rubber composition of claim 1 wherein the amount of the compound of the monovalent or divalent metal is 0.1 to 3 mol equivalents based on the amount of the carboxyl group of the vinyl chloride resin.

8. The thermoplastic rubber composition of claim 1 wherein the amount of the plasticizer is 20 to 300 parts by weight per 100 parts by weight of the vinyl chloride resin.

9. The thermoplastic rubber composition of claim 1 which comprises a nitrile rubber containing not less than 20% by weight of a gel insoluble in methylethyl ketone and which is obtained by copolymerizing monomers having plural double bonds in a molecule, a vinyl chloride resin which is a copolymer of vinyl chloride and a carboxyl group-containing monomer, said resin containing 0.05 to 20% by weight of carboxyl groups, a compound of a divalent metal and, as a plasticizer, a phthalate ester.

10. The thermoplastic rubber composition of claim 9 wherein said monomer having plural double bonds in a molecule is divinylbenzene, diallyl phthalate, diallyl maleate or trimethylolpropane triacrylate.

11. The thermoplastic rubber composition of claim 9 wherein the vinyl chloride resin is a copolymer of vinyl chloride and a monocarboxylic acid, a dicarboxylic acid or a dicarboxylic acid monoester.

12. The thermoplastic rubber composition of claim 9 wherein the carboxyl group-containing monomer is acrylic acid, methacrylic acid, crotonic acid, cinnamic acid, maleic acid, fumaric acid, itaconic acid, citraconic acid, monomethyl maleate, monoethyl maleate, monobutyl maleate, monomethyl itaconate, monoethyl itaconate or monobutyl itaconate.

13. The thermoplastic rubber composition of claim 9 wherein the compound of a divalent metal is an oxide, hydroxide, carboxylate, thiocarboxylate, sulfonate or phosphate of magnesium, calcium, barium, zinc or cadmium.

14. The thermoplastic rubber composition of claim 9 wherein the phthalate ester is di-2-ethylhexyl phthlate, di-n-octyl phthalate, diisodecyl phthalate, diisobutyl phthalate, or dihexyl phthalate.

15. The thermoplastic rubber composition of claim 1 wherein the mixing weight ratio of the nitrile rubber to the vinyl chloride resin is 10:90 to 80:20.

16. The thermoplastic rubber composition of claim 1 wherein the mixing weight ratio of the nitrile rubber to the vinyl chloride resin is from 20:100 to 300:100.

17. The thermoplastic rubber composition of claim 9 wherein the compound of the divalent metal is a complex salt of acetylacetonate and a metal selected from the group consisting of magnesium, calcium, barium, zinc and cadmium.

18. The thermoplastic rubber composition of claim 17 wherein the metal is magnesium.

* * * * *